(12) United States Patent
Klinkert et al.

(10) Patent No.: US 8,919,300 B2
(45) Date of Patent: Dec. 30, 2014

(54) VEHICLE WITH FAN UNIT PRODUCING AN AMPLIFIED AIR FLOW TO A HEAT EXCHANGER

(71) Applicant: Audi AG, Ingolstadt (DE)

(72) Inventors: Carsten Klinkert, Hitzhofen (DE); Sebastian Schwartze, Ingolstadt (DE); Eduard Main, Memmingen (DE); Siegfried Karmann, Gaimersheim (DE)

(73) Assignee: Audi AG, Ingolstadt (DE)

( * ) Notice: Subject to any disclaimer, the term of this patent is extended or adjusted under 35 U.S.C. 154(b) by 16 days.

(21) Appl. No.: 13/710,939

(22) Filed: Dec. 11, 2012

(65) Prior Publication Data

US 2013/0146001 A1    Jun. 13, 2013

(30) Foreign Application Priority Data

Dec. 12, 2011   (DE) .......................... 10 2011 120 865

(51) Int. Cl.
| | |
|---|---|
| *F01P 7/00* | (2006.01) |
| *F04F 5/16* | (2006.01) |
| *F04D 25/08* | (2006.01) |
| *B60K 11/08* | (2006.01) |
| *B60H 1/00* | (2006.01) |
| *F01P 5/02* | (2006.01) |

(52) U.S. Cl.
CPC .............. *B60H 1/00021* (2013.01); *F04F 5/16* (2013.01); *F04D 25/08* (2013.01); *B60K 11/08* (2013.01); *F01P 5/02* (2013.01)
USPC ...................................... 123/41.58; 180/68.1

(58) Field of Classification Search
CPC ........ F01P 11/10; F01P 5/06; B60R 2019/52; B60R 2019/525; B60R 2019/527; B60R 2019/486; B60K 11/085
USPC ........... 123/41.56, 41.58, 41.62, 41.7, 195 R, 123/195 C, 198 E, 41.63, 41.65; 180/68.1–68.4, 68.6; 165/44; 293/115
See application file for complete search history.

(56) References Cited

U.S. PATENT DOCUMENTS

| | | | | |
|---|---|---|---|---|
| 1,376,178 | A | * | 4/1921 | Wagenseil ................... 180/68.4 |
| 2,159,599 | A | * | 5/1939 | Morrison ................... 123/41.06 |
| 2,216,111 | A | * | 10/1940 | Huet ............................ 180/68.4 |
| 2,358,663 | A | * | 9/1944 | Poul ............................ 180/68.2 |
| 2,697,490 | A | * | 12/1954 | Taber ........................... 180/68.4 |
| 2,783,978 | A | * | 3/1957 | Baumgarten ................... 165/44 |
| 3,933,136 | A | * | 1/1976 | Burst ........................ 123/41.58 |
| 4,566,407 | A | * | 1/1986 | Peter .......................... 123/41.48 |
| 4,723,594 | A | * | 2/1988 | Koehr et al. ..................... 165/44 |

(Continued)

FOREIGN PATENT DOCUMENTS

| | | |
|---|---|---|
| CH | 306 141 | 6/1955 |
| DE | 102 39 936 | 3/2004 |

(Continued)

*Primary Examiner* — Hung Q Nguyen
(74) *Attorney, Agent, or Firm* — Henry M. Feiereisen LLC

(57) ABSTRACT

A vehicle includes a heat exchanger which is disposed in a cooling system, and a fan unit which forms part of a radiator grille and is constructed to generate an air flow through the heat exchanger. The fan unit has at least one fan which is constructed to generate a primary air flow, and a ring element which is constructed to generate from the primary air flow an amplified secondary air flow to the heat exchanger.

13 Claims, 2 Drawing Sheets

(56) References Cited

U.S. PATENT DOCUMENTS

| | | | | |
|---|---|---|---|---|
| 5,476,138 A | * | 12/1995 | Iwasaki et al. | 165/41 |
| 5,588,482 A | * | 12/1996 | Holka | 165/44 |
| 2008/0017138 A1 | * | 1/2008 | Rogg | 123/41.05 |
| 2011/0187134 A1 | * | 8/2011 | Steller et al. | 293/115 |

FOREIGN PATENT DOCUMENTS

| | | | |
|---|---|---|---|
| DE | 102006040429 | 3/2007 | |
| JP | 54110519 A * | 8/1979 | ............. F01P 11/12 |
| WO | WO 97/26450 | 7/1997 | |
| WO | WO 2009/030879 | 3/2009 | |

* cited by examiner

VEHICLE WITH FAN UNIT PRODUCING AN AMPLIFIED AIR FLOW TO A HEAT EXCHANGER

CROSS-REFERENCES TO RELATED APPLICATIONS

This application claims the priority of German Patent Application, Serial No. 10 2011 120 865.1, filed Dec. 12, 2012, pursuant to 35 U.S.C. 119(a)-(d), the content of which is incorporated herein by reference in its entirety as if fully set forth herein.

BACKGROUND OF THE INVENTION

The present invention relates to a vehicle having a fan unit with a heat exchanger.

The following discussion of related art is provided to assist the reader in understanding the advantages of the invention, and is not to be construed as an admission that this related art is prior art to this invention.

Conventional vehicles use a fan unit to pull air for conduction through a heat exchanger in order to improve efficiency during heat exchange. When the vehicle is at a standstill for example, such a fan unit provides adequate dissipation of heat energy from a cooling system via the heat exchanger.

It would be desirable and advantageous to provide a vehicle with an improved fan unit to obviate prior art shortcomings.

SUMMARY OF THE INVENTION

According to one aspect of the present invention, a vehicle includes a heat exchanger disposed in a cooling system, and a fan unit forming part of a radiator grille and constructed to generate an air flow through the heat exchanger, the fan unit having at least one fan constructed to generate a primary air flow and having a ring element constructed to generate from the primary air flow an amplified secondary air flow to the heat exchanger.

In accordance with the present invention, a fairly weak primary air flow is amplified using aerodynamic effects to generate a much stronger secondary air flow in the direction of the heat exchanger so as to ensure sufficient ambient air to be forced through the heat exchanger in a simple manner and to allow flexible use of available installation space. The fan unit is inconspicuous and compact and thus requires little space for integration into the vehicle in the absence of any freely accessible rotating parts so that a risk of injury is minimized.

According to another advantageous feature of the present invention, the ring element can have a hollow configuration formed on an inside with a circumferential gap, with the fan unit having a blower for blowing the primary air flow into the ring element. The blower can be positioned at almost any location next to the ring element. The sole purpose of the blower is to pull the primary air flow from the surrounding environment into the ring element. Thus, the blower can be constructed compact. The air flow exiting the gap is accelerated by the ring element so that additional air is drawn in and an amplified secondary air flow is fed to the heat exchanger by the ring element. As the ring element is devoid of any rotating rotor blades, there is effectively no risk of injury during operation of the fan.

According to another advantageous feature of the present invention, the ring element can have a wing profile. The ring element may hereby have a circular, elliptic, rectangular, or trapezoidal configuration.

According to another advantageous feature of the present invention, the ring element can form at least in part a frame of the radiator grille. By using the ring element as frame of a radiator grille, the fan unit can be integrated in the overall look of the vehicle in a very inconspicuous manner.

According to another advantageous feature of the present invention, the fan unit can include a plurality of fans. The presence of several fans permits overall a further increase of the air flow through the heat exchanger and the air flow can be controlled in a desired manner.

According to another advantageous feature of the present invention, the fan unit can be positioned in front of the heat exchanger, as viewed in a travel direction.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

The depicted embodiment is to be understood as illustrative of the invention and not as limiting in any way. It should also be understood that the figure is not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 1:
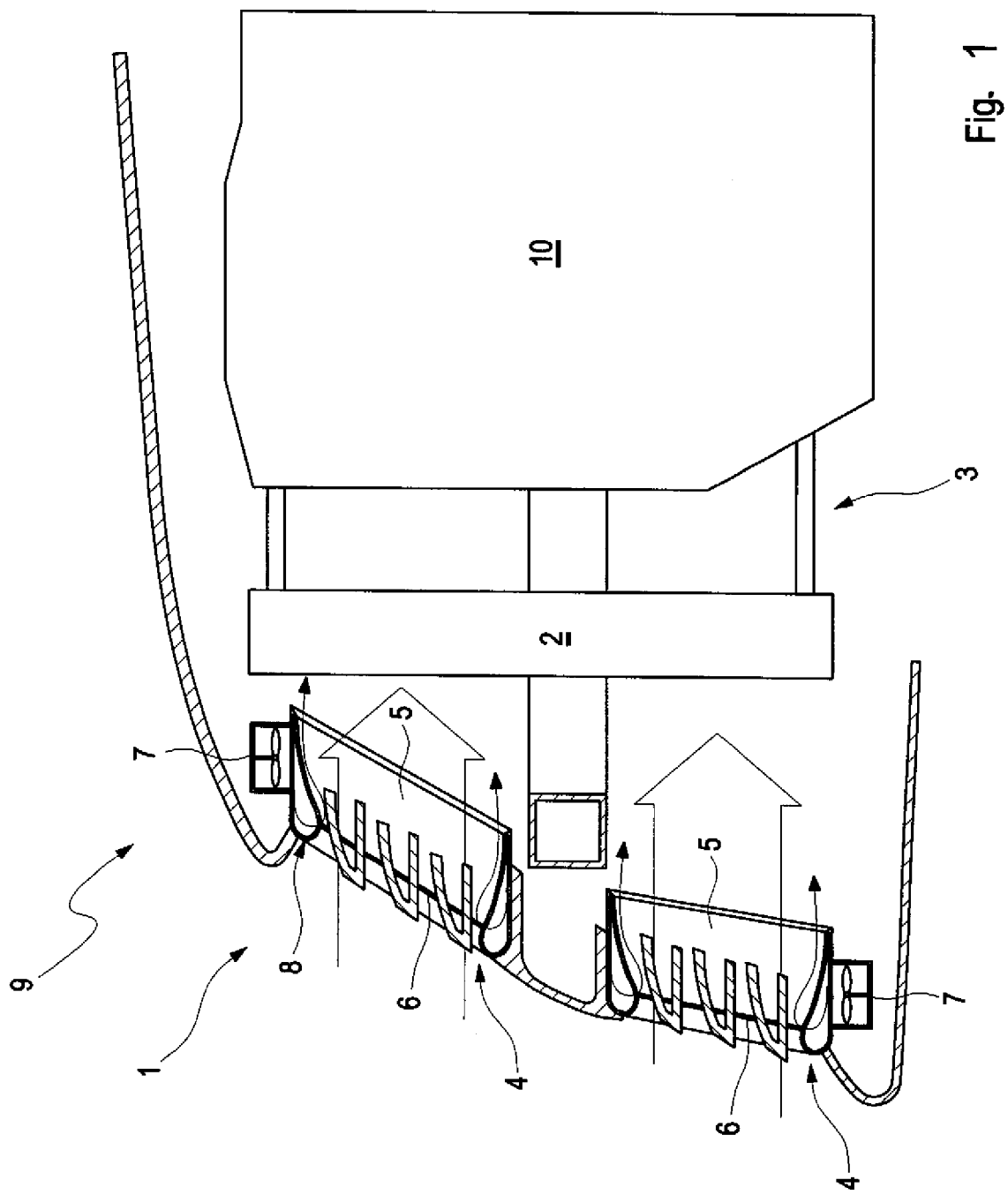
FIG. 1 shows a lateral sectional view of a vehicle front with a fan unit according to the present invention.

Turning now to FIG. 1, there is shown a lateral sectional view of a front portion of a vehicle, generally designated by reference numeral 9 and including an engine 10 which is cooled by coolant from a cooling system 3. As the engine 10 outputs power, coolant absorbs lost heat for conduction to a heat exchanger 2 which operates as heat sink for recooling. By way of example, the heat exchanger 2 may be constructed as a plate heat exchanger and is positioned perpendicular in front of the engine 10, as viewed in travel direction. Arranged in front of the heat exchanger 2 is a fan unit, generally designated by reference numeral 1 and including two fans 4. Each fan 4 is constructed to include a hollow ring element 5 and a blower 7 to pull a primary air flow into the ring element 5. As indicated by the arrows, the primary air flow is able to exit the ring element 5 in the direction of the heat exchanger 2 via a circumferential gap 6 on an inner side of the ring element 5, with the inner side of the ring element 5 being configured as a wing profile. The primary air flow is thus accelerated as it exits through the gap 6 to induce a much stronger secondary air flow from the surrounding environment. The ring elements 5 of the fans 4 form hereby frame portions of a radiator grille 8.

Figure 2:
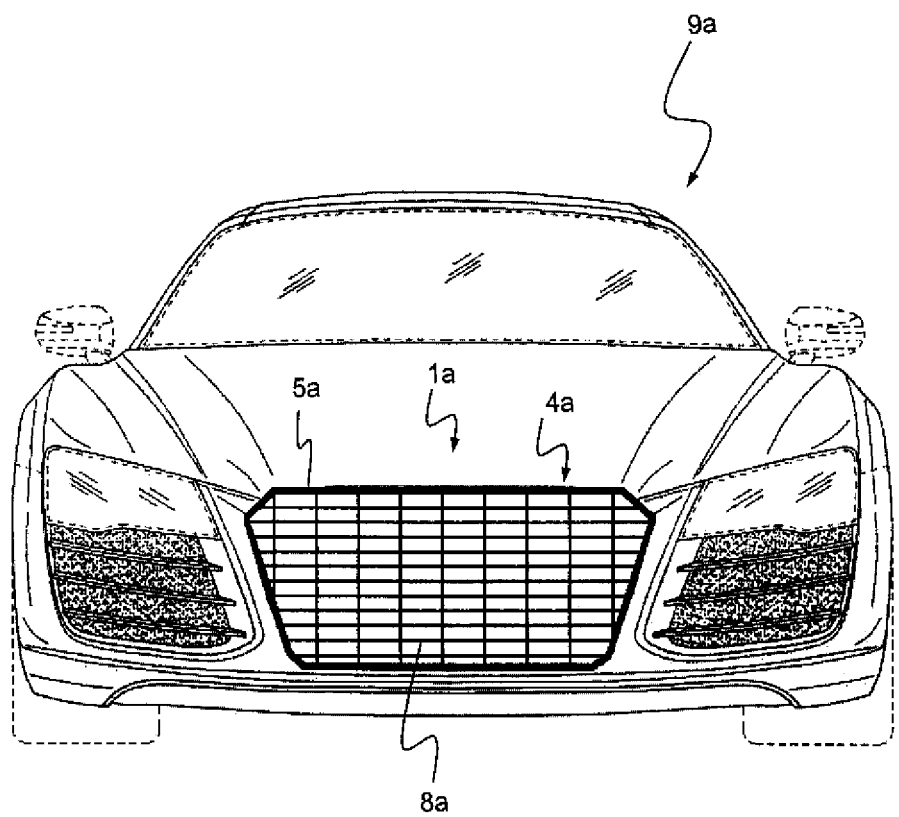
FIG. 2 shows a front view of a vehicle, depicting a radiator grille having integrated therein a modified embodiment of a fan unit according to the present invention.

FIG. 2 shows by way of example a front view of a vehicle, generally designated by reference numeral 9a. In the following description, parts corresponding with those of FIG. 1 will be identified, where appropriate for the understanding of the invention, by corresponding reference numerals followed by an "a". In this embodiment, provision is made for a fan unit 1a which includes a single fan 4a having a hollow ring element 5a. The ring element 5a is configured in a same manner as the ring element 5 and forms a frame of the radiator grille 8a. Although not shown in detail in FIG. 2, the fan unit 1a includes two blowers placed at appropriate locations, suitable on one side or on opposite sides of the ring element 5a, as viewed in a second direction which is transverse to the first direction in which the fan unit is arranged in front of the heat exchanger 2, to ensure intake of sufficient air into the ring element 5a.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A vehicle, comprising:
a heat exchanger disposed in a cooling system; and
a fan unit arranged in front of the heat exchanger as viewed in a first direction, said fan unit forming part of a radiator grille and constructed to generate an air flow through the heat exchanger, said fan unit having at least one fan constructed to generate a primary air flow, a ring element which is constructed to provide exit of the primary air flow and to generate from the primary air flow an amplified secondary air flow to the heat exchanger, and which has opposite sides spaced from one another in a second direction which is transverse to the first direction, and a blower arranged on one of the sides of the ring element for providing an intake of air in the second direction into the ring element.

2. The vehicle of claim 1, wherein the ring element has a hollow configuration formed on an inside with a circumferential gap via which the primary air flow exits the ring element in direction of the heat exchanger.

3. The vehicle of claim 1, wherein the ring element forms at least in part a frame of the radiator grille.

4. The vehicle of claim 1, wherein the fan unit includes a plurality of said fan.

5. The vehicle of claim 1, wherein the ring element has a wing profile.

6. The vehicle of claim 1, wherein the fan unit is positioned in front of the heat exchanger, as viewed in a travel direction.

7. The vehicle of claim 1, further comprising an internal combustion engine, said heat exchanger being arranged between the fan unit and the internal combustion engine, as viewed in travel direction.

8. The vehicle of claim 1, wherein the fan unit further comprises another blower arranged on an opposite side of the ring element as considered in the second direction and also providing an intake of air into the ring element.

9. In combination,
a radiator grille; and
a fan unit forming part of the radiator grille and being arranged in front of a heat exchanger disposed in a cooling system of a vehicle, as viewed in a first direction, said fan unit including at least one fan constructed to generate a primary air flow, a ring element which is constructed to provide exit of the primary air flow and to generate from the primary air flow an amplified secondary air flow to the heat exchanger disposed in the cooling system of the vehicle, and which ring element has opposite sides spaced from one another in a second direction which is transverse to the first direction, and a blower arranged on one of the sides of the ring element for providing an intake of air in the second direction into the ring element.

10. The combination of claim 9, wherein the ring element has a hollow configuration formed on an inside with a circumferential gap via which the primary air flow exits the ring element in direction of the heat exchanger.

11. The combination of claim 9, wherein the ring element forms at least in part a frame of the radiator grille.

12. The combination of claim 9, wherein the ring element has a wing profile.

13. The combination of claim 9, wherein the fan unit further comprises another blower arranged on an opposite side of the ring element as considered in the second direction and also providing an intake of air into the ring element.

* * * * *